United States Patent Office 3,686,103
Patented Aug. 22, 1972

3,686,103
PROCESS OF MAKING EPOXY CELLULAR PLASTICS USING BORON TRIFLUORIDE COMPLEXES
Siegfried Gowecke, Kelkheim, Taunus, Germany, assignor to Farbwerke Hoechst Aktiengesellschaft vormals Meister Lucius & Bruning, Frankfurt am Main, Germany
No Drawing. Continuation of application Ser. No. 7,414, Feb. 6, 1970, which is a continuation-in-part of application Ser. No. 605,205, Dec. 28, 1966. This application Oct. 7, 1970, Ser. No. 78,922
Claims priority, application Germany, Jan. 5, 1966, F 48,093
Int. Cl. C08j 1/26
U.S. Cl. 260—2.5 EP
10 Claims

ABSTRACT OF THE DISCLOSURE

Epoxy cellular plastics are obtained by foaming epoxy resins without external heating in the presence of low-boiling organic solvents as blowing agents and complex compounds of boron trifluoride and aromatic amines as polymerization catalysts. The boron trifluoride complexing agents used are selected from 2-chloraniline, 3-chloraniline, 4-chloraniline, 2,4-dichloraniline, 2-chloro-4-methylaniline, 2-bromaniline, 2 - nitro - aniline, 3 - nitro-aniline, 4-nitro-aniline, 4-aminobenzoic acid ethyl ester, 2-methoxy-4-chloraniline, 4-chloro-diphenylamine, 2,2'-dichloro-benzidine, 4-chloro-1-naphthylamine, 1-chloro-2-naphthylamine and 4-methoxy-1-naphthylamine. Low temperature cures are achieved which produce cellular plastics having improved properties.

---

This application is a continuation-in-part of application Ser. No. 605,205 filed Dec. 28, 1966 and now abandoned, and of copending continuation application Ser. No. 7,414 filed Feb. 6, 1970 now abandoned. The present invention provides a process for making epoxy cellular plastics.

It is known that cellular plastics can be made from epoxy resins by means of appropriate curing agents in the presence of a blowing agent. As curing agents there may be used dicarboxylic acids, acid anhydrides or primary di- and polyamines. U.S. Pat. Nos. 3,057,665 and 3,051,665 also disclose catalytic cures with boron trifluoride dihydrate and with boron trifluoride complex compounds of aliphatic alcohols in the presence of fluorinated chlorohydrocarbons. A drawback of this process is the extraordinarily high reactivity of the boron trifluoride complex compounds disclosed in these patents. Because of this high reactivity the components are not always completely mixed before the mixture foams up. The reactive boron trifluoride complex compounds used, furthermore, bring about undesirably high temperatures within the cellular plastic so that the epoxy resin polymerizes more quickly than the blowing agent used can evaporate. This gives rise to tensions within the cellular plastic block, which may cause numerous cracks. Large-sized cellular plastic blocks of a uniform structure can therefore not be made by means of the boron trifluoride catalysts previously disclosed.

It is furthermore known that, for example, in the field of casting resins and lacquers and varnishes, complex compounds of boron trifluoride and amines can be used as so-called latent curing agents which, in admixture with epoxy resins, are storable at room temperature for a prolonged period of time without being altered and which only start decomposing at a temperature ranging from 100° to 200° C. while initiating the polymerization. These complex compounds which only tend to decompose at elevated temperatures are derived from amines of a comparatively high basicity, such as triethyl amine, benzyl amine, aniline, N-methyl-aniline and 2,4-dimethylaniline.

It has now been found that cellular plastics can advantageously be obtained from epoxy resins by foaming the resins in the presence of 2 to 30% by weight, based on the total weight of the mixture, of a low-boiling organic solvent as a blowing agent, by using complex compounds of boron trifluoride and certain aromatic amines selected from the group consisting of 2-chloraniline, 3-chloraniline, 4-chloraniline, 2,4-dichloraniline, 2-chloro-4-methyl-aniline, 2-bromaniline, 2-nitro-aniline, 3-nitro-aniline, 4 - nitro - aniline, 4 - aminobenzoic acid ethyl ester, 2-methoxy-4-chloraniline, 4-chloro - diphenylamine, 2,2'-dichloro-benzidine, 4-chloro - 1 - naphthylamine, 1-chloro-2-naphthylamine or 4-methoxy-1 - naphthylamine. Complex compounds of boron trifluoride and the foregoing amines, whose molecular ratios of boron trifluoride to the amino group are preferably 1:1, can be stored for an unlimited period of time at room temperature, i.e., at a temperature of 20° to 30° C., and they do not decompose when briefly heated to a temperature of 80° to 100° C. It is therefore unexpected that they cure epoxy resins to produce superior products at initiating temperatures of 15° to 30° C. and without the application of external heat.

In some cases it may be advantageous to add more than 1 mol of boron trifluoride per mol of amine, for example, if more than 1 amino group is present in the molecule or if the substituents are also capable of complexing with boron trifluoride, such as in amines containing carboxylic acid ester groups as substituents.

The complex compounds of the amine and boron trifluoride may be used as such or in mixture with one another in the form of solutions having from 1 to 75% strength, preferably from 10 to 50%. Appropriate solvents are, for example, ethers, such as lower alkyl ethers, for example, diethyl ether, cyclic ethers, for example, dioxane; ketones such as acetone; saturated aliphatic alcohols containing preferably from 1 to 6 carbon atoms, such as methanol, ethanol, ethylene glycol, butane-diol-1,4, diethylene glycol or triethylene glycol. Particularly suitable solvents are the alcohols mentioned above, in particular, diols, since they are incorporated in the macromolecule during the polymerization of the epoxy resin without prematurely terminating the polymerization. In relation to the average equivalent of epoxy resin, 0.0001 to 0.1 equivalent, preferably 0.001 to 0.01 equivalent of the amine complex compound is required to assure a sufficient cross-linking. In order to complete the reaction, it may, moreover, be of advantage to after-cure the finished cellular plastic block at a temperature in the range of from 30 to 150° C., preferably from 50 to 90° C.

The complex compounds of amine and boron trifluoride can be prepared according to known methods by introducing gaseous boron trifluoride into a solution of the amine or by reacting the amine with boron trifluoride etherate. Appropriate inert solvents are, for example, benzene, methylene chloride or diethyl ether. The complex compounds may, however, also be prepared, without preliminary isolation of the adduct of boron trifluoride and amine, directly in the solvent, preferably one of the diols mentioned above, in which the complex compound is advantageously added to the cellular plastic batch in dissolved form.

The term "epoxy resins" as used herein comprises compounds having more than one epoxy group in the molecule, for example, reaction products of epichlorhydrin with polyhydric alcohols and, in particular, with mono- and polynuclear polyvalent phenols. Moreover, reaction products of epichlorhydrin with mono- and polyamines as well as di- and polyglycidyl esters may be used. For foaming up, there are also suitable such compounds as may be obtained by epoxidation of open-chained or cyclic di- and polyolefins, dienes, cyclic dienes or diolefinically unsaturated carboxylic acid esters. Telomers and cotelomers containing glycidyl ether groups and/or glycidyl ester groups may also be mentioned. The epoxy resins obtained by reacting 2,3-diphenylol propane with epichlorhydrin in an alkaline medium are preferably used. It is furthermore possible to replace up to 60% by weight, preferably 5 to 30% by weight, of the epoxy resins by other compounds which undergo cationic polymerization. Such compounds are, for example, cyclic ethers such as propylene oxide, trioxane, or tetrahydrofurane. Also cyclic acetals, such as ethylene glycol formal, propanediol-1,2-formal or butane-diol-1,4-formal, or lactones, such as beta-propiolactone, beta-butyrolactone, gamma-butyrolactone or eta-caprolactone may be used.

The epoxy resins are foamed in known manner by adding easily evaporating halohydrocarbons having a boiling point, preferably, in the range of from −10 to +80° C., at atmospheric pressure, such as monofluorodichloromethane, monofluorotrichloromethane, 1,2,2 - trifluorotrichloroethane, 1,1,3,2-tetrafluorodichlorethane, methylene chloride, carbon tetrachloride or chloroform.

To obtain the most uniform possible pores in the cellular plastic, it is furthermore advantageous to add pore-regulating agents such as silicone oils. Moreover, fillers, dyestuffs, plasticizers or fire-retardant agents may be added to the mixture to be foamed.

The complex compounds of boron trifluoride and aromatic amines used in accordance with the present invention provide a number of important advantages in the foaming of epoxy resins. Thus they permit the pot life of the mixture to be foamed to be adjusted to the most suitable length of time. In most cases when these complex compounds are used, foaming starts only after a period of from 3 to 30 minutes after mixing. Therefore even large amounts of resin can be easily mixed by hand or by means of a simple stirrer and can be charged into molds of a complicated shape before foaming starts.

In some cases the speed and uniformity of polymerization can be better controlled by using mixtures of the present complex compounds which have different reactivities. In accordance with this mode of operation, foaming is started with a first complex compound having relatively high reactivity, and a second complex compound having a relatively lower reactivity is used which starts decomposing only after a somewhat elevated temperature is achieved and which completes the cure of the cellular plastic.

Another advantage achieved when using the complex compounds disclosed herein arises out of the fact that they provide a relatively slow foaming reaction since the boron trifluoride that initiates the polymerization of the epoxy resin is only slowly liberated from the complex compound. Generally the foam reaches its fully expanded height only after a period of 10 to 30 minutes. Thus the halohydrocarbon added as a blowing agent can evaporate completely before the cellular block becomes rigid and free from stickiness. Hence foams of particularly low unit weight can be obtained. In addition the relatively slow and even initiation of the polymerization inhibits the generation of internal tensions within the cellular plastic block, and the formation of internal cracks and other defects, particularly in large blocks, is avoided.

The cellular plastics made according to the invention may be used as packing material, in sandwich constructions and as insulting material against cold, warmth, sound and shock as well as in the field of electrical engineering.

The following examples serve to illustrate the present invention, but they are not intended to limit it thereto, the parts being by weight. The epoxy resin A is a diglycidyl ether of 4,4'-dioxydiphenyl-2,3-propane having an epoxide equivalent of 190, and the epoxy resin B is a diglycidyl ether of 4,4'-dioxydiphenyl-2,2-propane having an epoxide equivalent of 500.

EXAMPLE 1

100 parts of epoxy resin A
15 parts of monofluorotrichloromethane
1 part of silicone oil and
3 parts of a 20% solution of 2-chloraniline/boron trifluoride in diethylene glycol The components were carefully mixed at 20° C. After about 7 minutes, the mixture started foaming and the foaming process was finished after another 8 minutes. There was obtained a cellular plastic free from cracks and holes, which had a unit weight of 32 grams per liter.

EXAMPLE 2

70 parts of epoxy resin A
30 parts of epoxy resin B
15 parts of monofluorotrichloromethane
1 part of silicone oil and
3 parts of a 20% solution of 2-chloraniline/boron trifluoride in diethylene glycol After mixing at 20° C., the mixture started foaming after about 8 minutes and ceased foaming after another 10 minutes. The cellular plastic had a unit weight of 30 grams per liter.

EXAMPLE 3

100 parts of a novolak containing epoxy groups and having an epoxide equivalent in the range of from 190 to 200
15 parts of monofluorotrichloromethane
1 part of silicone oil and
3 parts of a 20% solution of 2-chloraniline/boron trifluoride in diethylene glycol After mixing at 20° C., the mixture started foaming after about 10 minutes and ceased foaming after another 12 minutes. The resulting cellular plastic had a unit weight of 35 grams per liter.

EXAMPLE 4

50 parts of epoxy resin A
50 parts of a cotelomer of ethyl acrylate and glycidyl acrylate having an epoxide equivalent of 300
20 parts of monofluorotrichloromethane
1 part of silicone oil and
3 parts of a 20% solution of 2-bromaniline/boron trifluoride in diethylene glycol After mixing at 20° C., the mixture started foaming after about 8 minutes and ceased foaming after another 12 minutes. The resulting cellular plastic had a unit weight of 28 grams per liter.

EXAMPLE 5

70 parts of epoxy resin A
30 parts of epoxy resin B
15 parts of monofluorotrichloromethane
1 part of silicone oil and
4 parts of a 20% solution of 3-chloraniline/boron trifluoride in butane-diol-1,4

After mixing at 20° C., the mixture started foaming after about 45 minutes and ceased foaming after another 25 minutes. The resulting cellular plastic had a unit weight of 55 grams per liter.

EXAMPLE 6

70 parts of epoxy resin A
30 parts of epoxy resin B
15 parts of monofluorotrichloromethane
1 part of silicone oil and 3 parts of a 20% solution of 3-nitroaniline/boron trifluoride in ethylene glycol After mixing at 20° C., the mixture started foaming after 8 to 9 minutes and ceased foaming after another 5 to 6 minutes. The cellular plastic had a unit weight of 35 grams per liter.

EXAMPLE 7

70 parts of epoxy resin A
30 parts of epoxy resin B
10 parts of monofluorotrichloromethane
1 part of silicone oil and
3 parts of a 20% solution of 2,4-dichloraniline/boron trifluoride in diethylene glycol After mixing at 20° C., the mixture started foaming after 6 to 7 minutes and ceased foaming after another 6 minutes. The cellular plastic had a unit weight of 40 grams per liter.

EXAMPLE 8

70 parts of epoxy resin A
30 parts of epoxy resin B
15 parts of monofluorotrichloromethane
1 part of silicone oil and
3 parts of a 20% solution of 4-aminobenzoic acid ethyl ester/boron trifluoride in diethylene glycol After mixing at 20° C., the mixture started foaming after 27 to 28 minutes and ceased foaming after another 10 minutes. The cellular plastic had a unit weight of 34 grams per liter.

EXAMPLE 9

70 parts of epoxy resin A
30 parts of epoxy resin B
20 parts of monofluorotrichloromethane
1 part of silicone oil and
3 parts of a 20% solution of 4-nitroaniline/boron trifluoride in diethylene glycol After mixing at 20° C., the mixture started foaming after 1 to 1.5 minutes and already ceased after another 2 to 2.5 minutes. The cellular plastic had a unit weight of 25 grams per liter.

EXAMPLE 10

70 parts of epoxy resin A
30 parts of epoxy resin B
15 parts of monofluorotrichloromethane
1 part of silicone oil
1.5 parts of a 20% solution of 4-nitroaniline/boron trifluoride in diethylene glycol and
1.5 parts of a 20% solution of 3-chloraniline/boron trifluoride in diethylene glycol After mixing at 20° C., the mixture started foaming after about 3 minutes and ceased foaming after another 3 to 4 minutes. The cellular plastic had a unit weight of 35 grams per liter.

EXAMPLE 11

70 parts of epoxy resin A
30 parts of epoxy resin B
25 parts of monofluorotrichloromethane
1 part of silicone oil
2 parts of a 20% solution of 4-chloraniline/boron trifluoride in diethylene glycol and
1 part of a 20% solution of diphenyl amine/boron trifluoride in diethylene glycol After mixing at 20° C., the mixture started foaming after about 2 to 3 minutes and ceased foaming after another 3 to 4 minutes. The cellular plastic had a unit weight of 25 grams per liter.

EXAMPLE 12

70 parts of epoxy resin A
30 parts of epoxy resin B
20 parts of 1,2,2-trifluorotrichlorethane
1 part of silicone oil and
3 parts of a 20% solution of 2-amino-1-chloronaphthalene/boron trifluoride in methanol After mixing at 20° C., the mixture started foaming after about 5 minutes and ceased foaming after another 4 to 5 minutes. The cellular plastic had a unit weight of 30 grams per liter.

EXAMPLE 13

70 parts of epoxy resin A
30 parts of epoxy resin B
20 parts of trioxane
1 part of silicone oil and
3 parts of a 20% solution of 2-chloraniline/boron trifluoride in butane-diol-1,4

After mixing at 20° C., the mixture started foaming after about 5 minutes and ceased foaming after another 5 to 7 minutes. The cellular plastic had a unit weight of 37 grams per liter.

EXAMPLE 14 (COMPARISON EXAMPLE)

100 parts by weight of epoxide resin having a molecular weight of 400, an epoxide equivalent of 190 and a Hoeppler viscosity of 11,800 at 25° C., which epoxide had been prepared from epichlorhydrin and 2,2-(p,p'-dihydroxydiphenyl)propane, were mixed at 20° C. with 15 grams of monofluorotrichloromethane and 0.6 gram of a commercial pore regulator sold under the trade designation L 531 (Union Carbide Corporation). Boron trifluoride dihydrate in the form of a 5% by weight solution in diethylene glycol was used as a curing catalyst. Varying amounts of catalyst as indicated in the following table were mixed with the pre-formed mixture of epoxy resin, blowing agent and pore regulator while stirring for 1 minute at 25° C. with a rapid stirrer. The properties of the foamed products obtained are indicated in the table.

TABLE

| Exp. No. | Catalyst solution, parts by wt. | Foam properties |
|---|---|---|
| A | 3 | The mixture foamed up rapidly but then largely collapsed. |
| B | 4 | Same result as Exp. A. |
| C | 5 | The mixture foamed up rapidly, then hardened and did not shrink; however, it had numerous cracks and other physical defects. |

The foregoing comparison example shows that when small amounts of boron trifluoride dihydrate are used as a catalyst considerable shrinkage of the foamed product occurs, whereas when larger amounts of this catalyst are used, the foamed product hardens without gross shrinkage, but internal stresses are generated that produce cracks and the like.

I claim:

1. A process for the production of foamed epoxy cellular material which comprises foaming polyepoxy resins without the application of external heat in the presence of 2 to 30% by weight, based on the total weight of the mixture to be foamed, of a halohydrocarbon blowing agent having an atmospheric pressure boiling point in the range of from −10° to 80° C. and in the presence of a catalyst consisting of one or more complex compounds of boron trifluoride and aromatic amines selected from 2-chloraniline, 3-chloraniline, 4-chloraniline, 2,4-dichloraniline, 2-chloro-4-methyl-aniline, 2-bromaniline, 2-nitroaniline, 3-nitro-aniline, 4-nitro-aniline, 4-aminobenzoic acid ethyl ester, 2-methoxy-4-chloraniline, 4-chloro-diphenylamine, 2,2'-dichloro-benzidine, 4-chloro-1-naphthylamine, 1-chloro-2-naphthylamine and 4-methoxy-1-naphthylamine, the amount of catalyst being from 0.0001 to 0.1 equivalent per average epoxide equivalent of the polyepoxide used.

2. The process of claim 1 wherein monofluorochloromethane, monofluorotrichloromethane, 1,2,2-trifluorotrichlorethane, 1,1,2,2-tetrafluorodichlorethane, methylene chloride, carbon tetrachloride or chloroform is used as a blowing agent.

3. The process of claim 1 wherein epoxy resin is a reaction product obtained by reacting 2,2-diphenylol propane with epichlorhydrin in an alkaline medium is used.

4. A process according to claim 1 wherein the aromatic amine is 2-chloroaniline.

5. A process according to claim 1 wherein the aromatic amine is 2-bromoaniline.

6. A process according to claim 1 wherein the aromatic amine is 3-nitroaniline.

7. A process according to claim 1 wherein the aromatic amine is 2,4-dichloroaniline.

8. A process according to claim 1 wherein the aromatic amine is 4-amino-benzoic acid ethyl ester.

9. A process according to claim 1 wherein the aromatic amine is 4-nitroaniline.

10. A process according to claim 1 wherein the aromatic amine is 2-amino-1-chloronaphthalene.

References Cited
UNITED STATES PATENTS

| | | | |
|---|---|---|---|
| 2,824,083 | 2/1958 | Parry et al. | 260—47 EC |
| 3,051,665 | 8/1962 | Wismer | 260—2.5 EP |

MURRAY TILLMAN, Primary Examiner

M. FOELAK, Assistant Examiner

U.S. Cl. X.R.

260—47 EC, 47 N